US007424847B2

(12) United States Patent
Hart

(10) Patent No.: US 7,424,847 B2
(45) Date of Patent: Sep. 16, 2008

(54) DIAPHRAGM ASSEMBLY FOR A PUMP

(76) Inventor: Arthur S. Hart, 6567 Calle del Norte, Anaheim, CA (US) 92807

( * ) Notice: Subject to any disclaimer, the term of this patent is extended or adjusted under 35 U.S.C. 154(b) by 230 days.

(21) Appl. No.: 11/356,761

(22) Filed: Feb. 17, 2006

(65) Prior Publication Data

US 2006/0269425 A1 Nov. 30, 2006

Related U.S. Application Data

(60) Provisional application No. 60/684,900, filed on May 25, 2005.

(51) Int. Cl.
*F16J 3/02* (2006.01)

(52) U.S. Cl. .................................................... 92/98 R

(58) Field of Classification Search .................. 92/98 R
See application file for complete search history.

(56) References Cited

U.S. PATENT DOCUMENTS

| | | | | |
|---|---|---|---|---|
| 4,153,391 | A | 5/1979 | Hartley | |
| 4,597,151 | A | 7/1986 | Zaghi et al. | |
| 4,610,605 | A | 9/1986 | Hartley | |
| 5,632,607 | A | 5/1997 | Popescu et al. | |
| 5,791,882 | A | 8/1998 | Stucker et al. | |
| 6,048,183 | A | 4/2000 | Meza | |
| 6,126,403 | A | 10/2000 | Yamada | |
| 6,138,550 | A | 10/2000 | Fingar et al. | |
| 6,824,139 | B2 | 11/2004 | Barinaga et al. | |
| 6,883,417 | B2 | 4/2005 | Headley et al. | |
| 2005/0177201 | A1 * | 8/2005 | Freeman ...................... | 607/46 |

* cited by examiner

*Primary Examiner*—F. Daniel Lopez
(74) *Attorney, Agent, or Firm*—Stout, Uxa, Buyan & Mullins LLP; Linda A. Fox; Frank J. Uxa

(57) ABSTRACT

A diaphragm assembly is provided which includes one or more pistons and a frame circumscribing the piston or pistons. The diaphragm assembly is useful with a wobble plate pump. The piston or pistons and frame are made of different materials. For example, the piston is made of a material that has a greater stiffness, hardness or rigidity than the material of which the frame is made. The piston will not undergo substantially ballooning over long term use of the diaphragm assembly.

20 Claims, 7 Drawing Sheets

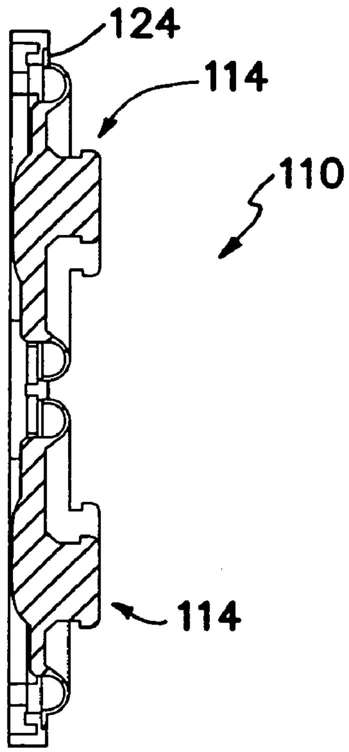
FIG. 8C
FIG. 9
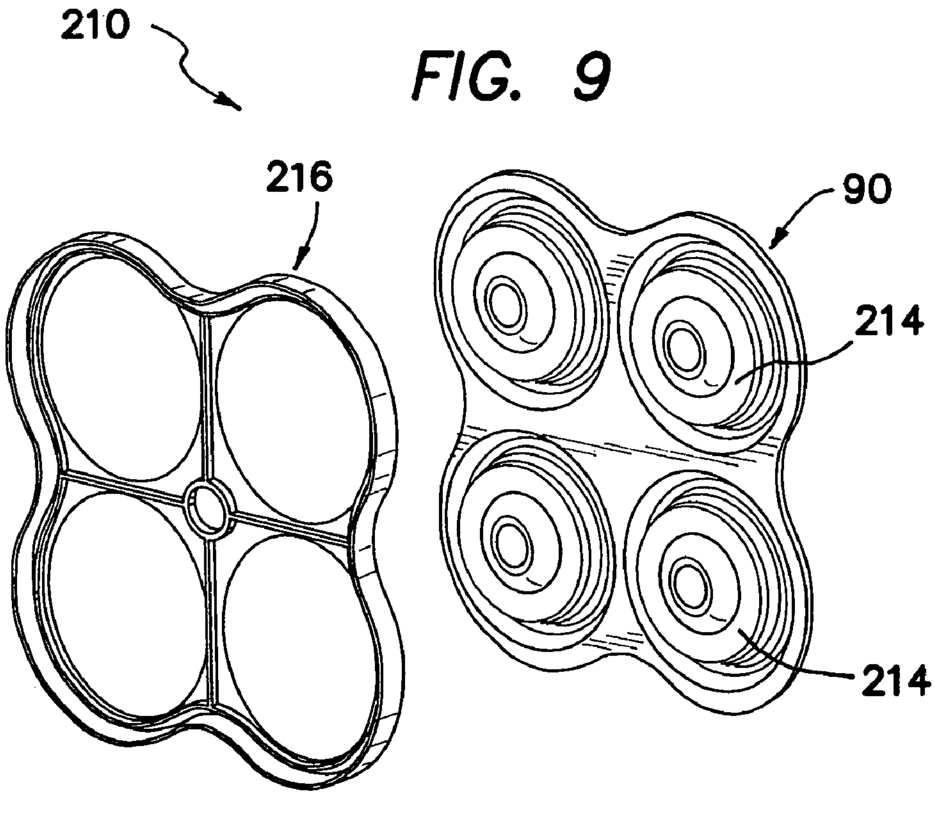

DIAPHRAGM ASSEMBLY FOR A PUMP

RELATED APPLICATION

The present application claims the benefit of U.S. Provisional Patent Application No. 60/684,900, filed on May 25, 2005, the entire disclosure of which is incorporated herein by reference.

BACKGROUND OF THE INVENTION

The present invention generally relates to a diaphragm assembly for a pump, and more specifically relates to a diaphragm assembly having an overmolded frame element.

Diaphragm pumps possess many advantages and are widely used. A linear reciprocating drive can be used for driving a diaphragm pump. A nutating or wobble plate drive can also be used to drive a diaphragm pump, and such construction is shown in U.S. Pat. No. 4,153,391 and U.S. Pat. No. 4,610,605. The entire disclosure of each of these U.S. patents is incorporated herein by reference.

Prior art wobble plate pumps have employed diaphragms, for example, two, three or four piston diaphragms, which effectively control the flow of fluid into and out of the pump. Such diaphragms, whether single or multiple piston diaphragms, are conventionally one piece molded structures made of elastic materials. These diaphragms typically include convoluted regions circumscribing a central pumping region. The convoluted regions, or convolutes, flex as the pistons are driven. Over a period of time, however, such conventional diaphragms are prone to ballooning of these convolutes, resulting in reduced pump pressure, sometimes very sudden drops in pump pressure, and inconsistent, poor efficiency.

It would be advantageous to provide new diaphragms for use in pumps, for example, diaphragm assemblies that are less prone to ballooning and/or provide more consistent fluid flow over time.

SUMMARY OF THE INVENTION

This invention provides diaphragm assemblies for pumps, for example, multi-piston diaphragm assemblies for pumps using wobble plate drives, and methods of making diaphragm assemblies. The present diaphragm assemblies are easy and inexpensive to produce and assemble, achieve outstanding performance and efficiency and have a long effective or useful life.

Such diaphragm assemblies in accordance with the invention can be made using conventional molding techniques while requiring very few materials. The present diaphragm assemblies can be used in place of conventional diaphragms in a wide variety of conventional pumps, including potable water pumps, industrial pumps, and/or other pumps where long term reliability is desirable or necessary.

In one aspect of the present invention, the diaphragm assemblies comprise at least one piston comprising a first material, and a frame element comprising a second material different from the first material. The frame is secured to the at least one piston. The diaphragm assemblies may comprise a single piston or a plurality of pistons, for example one piston, two pistons, three pistons, four pistons or more, depending on the desired application for which the diaphragm assembly will be used. For example, the at least one piston may comprise four pistons and the frame element is secured to a peripheral region of each piston. The frame element may be secured to the peripheral region of the at least one piston by any suitable technique, preferably a technique which provides a secure, fluid tight bond between the piston and the frame element. For example, the frame element may be secured to the piston by heat sealing, adhesively securing, molding and/or overmolding techniques. In a preferred embodiment of the invention, the frame element is overmolded to the peripheral region of each piston.

For reasons that will be explained hereinafter, the first material, of which the piston or pistons are made, is a material that has a greater or higher stiffness, rigidity, tensile strength, or hardness, than the second material. The first material may be a material that is generally less compressible than the second material.

Preferably, the first material comprises a polymeric material, for example, a polyolefin material, for example, a polypropylene material, for example, a homopolymer polypropylene material. The second material preferably comprises a polymeric material, for example, a thermoplastic polymeric material, for example, a thermoplastic elastomeric or rubber polymeric material, for example a crosslinked thermoplastic polymeric material.

In an especially advantageous embodiment, the first material comprises a polymeric material having a D Shore hardness and the second material comprises a polymeric material having an A Shore hardness. In one embodiment, the second material comprises a thermoplastic elastomeric material sold under the trademark Nexprene®. In a specific embodiment, the first material comprises a D Shore Nexprene® or Santoprene® equivalent material, and the second material comprises an A Shore Nexprene® or Santoprene® equivalent material.

The peripheral region of the piston of the present assemblies may comprise a pumping region and a generally annular region substantially circumscribing the pumping region. The pumping region moves in a generally axial direction when the piston is driven by a pump actuator, for example, a wobble plate pump actuator. The piston may also include, or can be considered to define, a convolute which facilitates the movement of the pumping region during the intake and discharge strokes. The convolute is located radially inwardly of the peripheral region and generally circumscribes the pumping region.

In a particularly useful embodiment of the invention, the thickness of the convolute is substantially less than the thickness of the pumping region. For example, the ratio of thickness of the pumping region to thickness of the convolute may be about 2:1, or about 3:1, or about 4:1, or about 5:1 or greater.

The assemblies of the invention are configured to be useful as a part of a pumping system. For example, the piston further includes structure for operatively coupling the piston to a pump actuator. For example, the piston may include an integrally molded projection extending outwardly or axially from the pumping region, the projection being configured to engage a pump actuator mechanism. Alternatively or additionally, the piston may be configured to include an aperture or other suitable structure for facilitating operative coupling thereof to a pump actuator mechanism.

Advantageously, the diaphragm assemblies are structured to resist ballooning of the piston or pistons during use. For example, the diaphragm assemblies are structured to resist excessive stretching resulting in ballooning of the convolute during use. Such ballooning is common in conventional diaphragms for pumps, for example, one-piece diaphragms molded of solid elastic materials, and typically results in poor pump performance or degradation of pump performance over time.

The present invention is designed to provide consistent pumping pressure over the life of the diaphragm assembly.

For example, in some embodiments of the invention, the diaphragm assemblies are structured so that the convolute of the piston or pistons will burst or break at a predetermined pumping pressure without initial substantial ballooning thereof.

Each and every feature described herein, and each and every combination of two or more of such features, is included within the scope of the present invention provided that the features included in such a combination are not mutually inconsistent.

These and other aspects of the present invention are apparent in the following detailed description and claims, particularly when considered in conjunction with the accompanying drawings in which like parts bear like reference numerals.

BRIEF DESCRIPTION OF THE DRAWINGS

FIG. 8C shows a cross-sectional view of the diaphragm assembly shown in FIGS. 8A and 8B as it appears when assembled.

FIG. 9 shows a top perspective exploded view of yet another diaphragm assembly of the invention.

DETAILED DESCRIPTION

Figure 1:
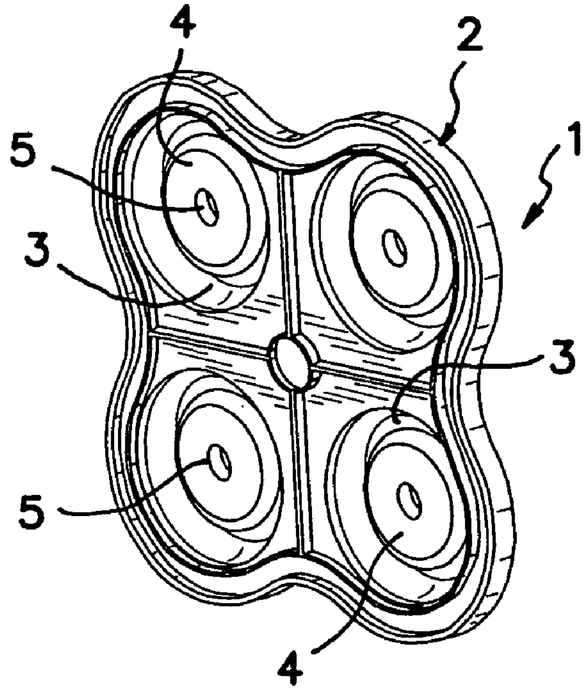
FIG. 1 PRIOR ART
FIG. 1 is a top plan view of a PRIOR ART diaphragm assembly suitable for use with a four chamber pump.
Figure 2:
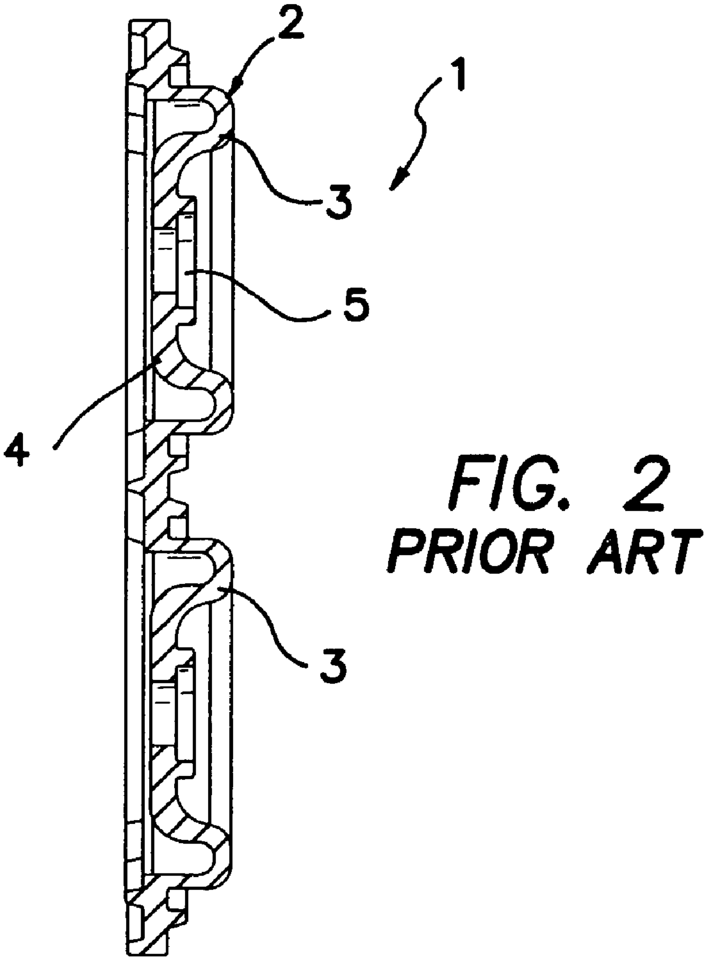
FIG. 2 PRIOR ART
FIG. 2 is a cross sectional view of the PRIOR ART diaphragm assembly shown in FIG. 1.
Figure 3:
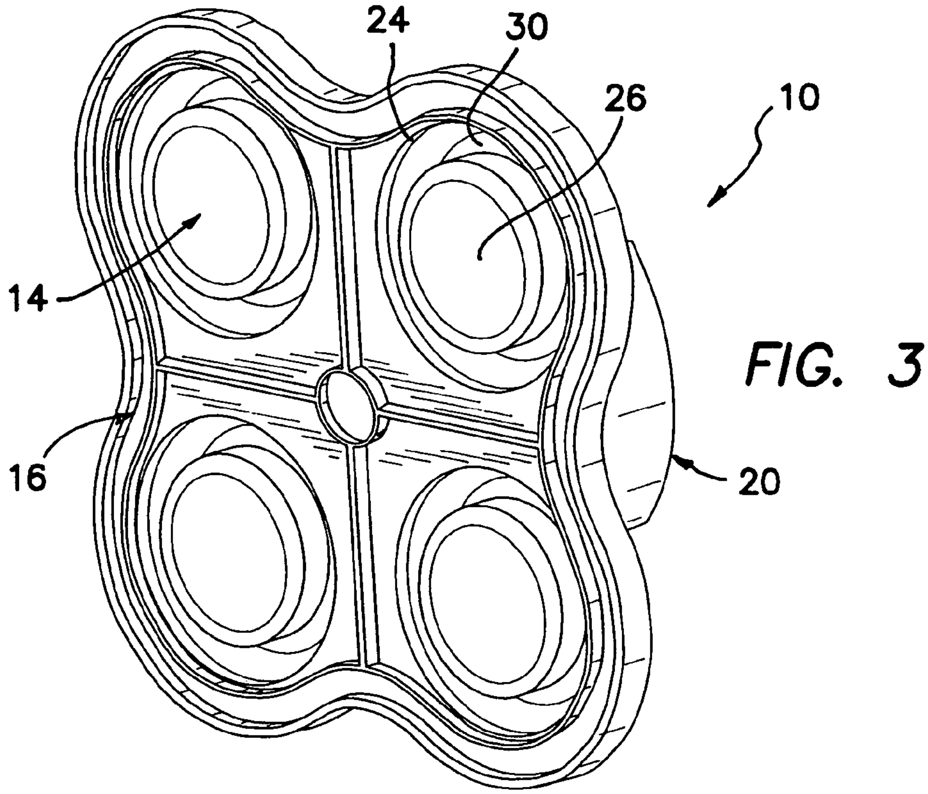
FIG. 3 is a perspective view of a diaphragm assembly, suitable for use with a four chamber pump, in accordance with the invention.
Figure 4:
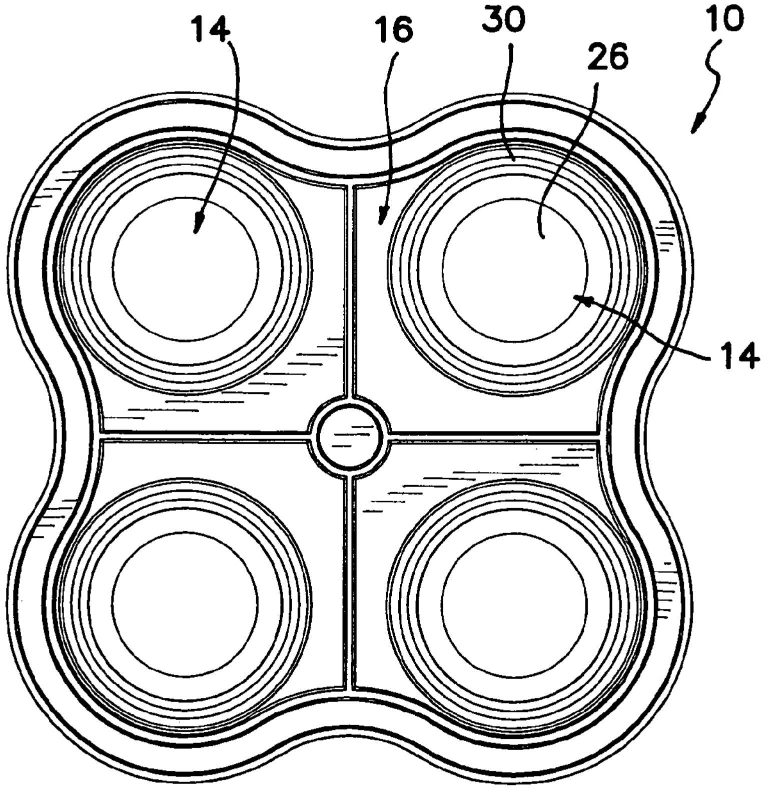
FIG. 4 is top plan view of the diaphragm assembly shown in FIG. 3.
Figure 5:
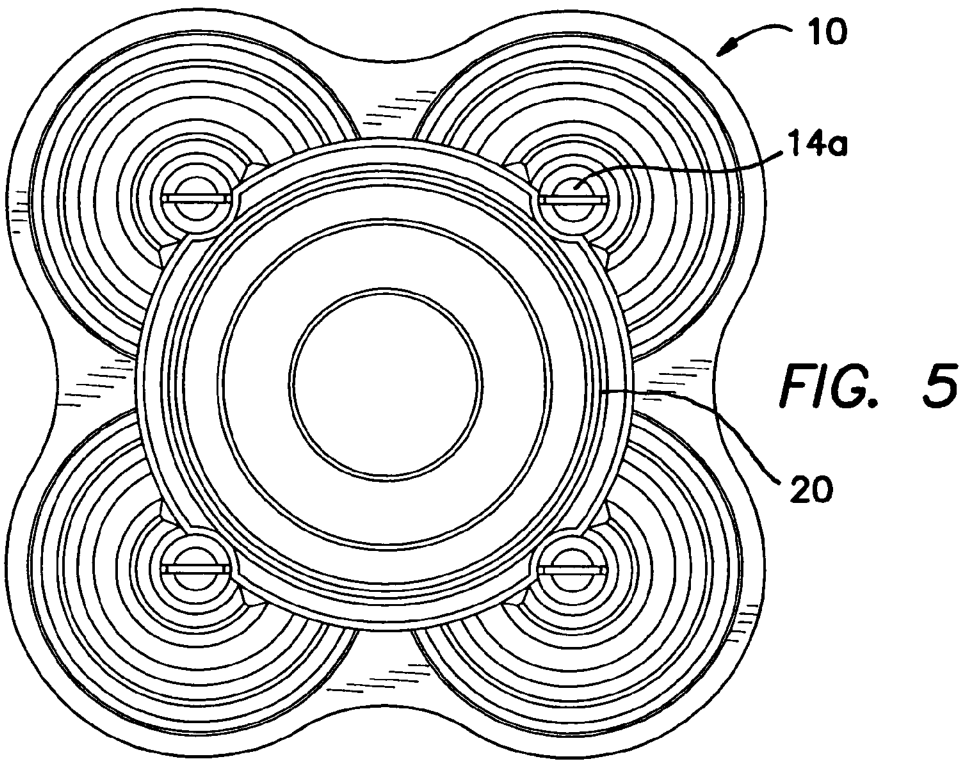
FIG. 5 is a bottom plan view of the diaphragm assembly shown in FIG. 3, showing the diaphragm assembly connected to a wobble plate drive.

FIGS. 1 and 2 show a PRIOR ART four piston diaphragm 1 useful with a four chamber pump (not shown). The diaphragm 1 generally comprises a unitary molded element 2 comprising a flexible elastic material. The diaphragm 1 primarily flexes at annular convolute regions 3 as pistons 4 are driven by an actuator (not shown) coupled at piston apertures 5. Over time, the pumping action causes the convolute regions 3 begin to become fatigued, thereby compromising the integrity of the diaphragm 1. Typically, as the convolute regions 3 become fatigued, they become stretched and ballooned during pumping. This results in flow changes, inconsistent pump output and a general drop in pump pressure. At some point, the diaphragm 1 must be disposed of and replaced with a new diaphragm.

FIGS. 3-6 show an exemplary diaphragm assembly in accordance with the present invention, generally at 10.

The diaphragm assembly 10 generally comprises at least one piston 14 comprising a first material, and a frame element 16 comprising a second material. The frame element 16 circumscribes the at least one piston 14. The second material may be physically, for example, compositionally, different from the first material. This feature of the present invention may be better appreciated with reference to FIG. 6, which shows that the piston 14 and frame element 16 are not two portions of a single, unitary molded component, but are separate elements. Advantageously, in this embodiment, the frame element 16 is overmolded to peripheral regions of the piston 14 to provide a fluid-tight seal therebetween.

In the embodiment shown, four pistons 14 are provided for coupling the diaphragm assembly 10 to a four chamber pump actuator. For example, each piston 14 includes appropriate structure for enabling the diaphragm assembly 10 to be operatively coupled between a fluid chamber housing (not shown) and a pump actuator housing 20, shown in FIGS. 3 and 6. When the diaphragm assembly 10 is mated with a structure such as a pump body (not shown), the pistons 14 can be driven within the frame element 16 in response to a pump drive or actuator, for example, in a nutating motion in response to a wobble plate pump actuator.

Although the following detailed description will generally describe four piston diaphragm assemblies, it is to be appreciated that diaphragm assemblies in accordance with other embodiments of the invention may have less than four pistons, or more than four pistons. For example, diaphragm assemblies in accordance with the invention may comprise one piston, two pistons, three pistons, five pistons or more, depending on the desired application for which the diaphragm assembly will be used.

Figure 7:
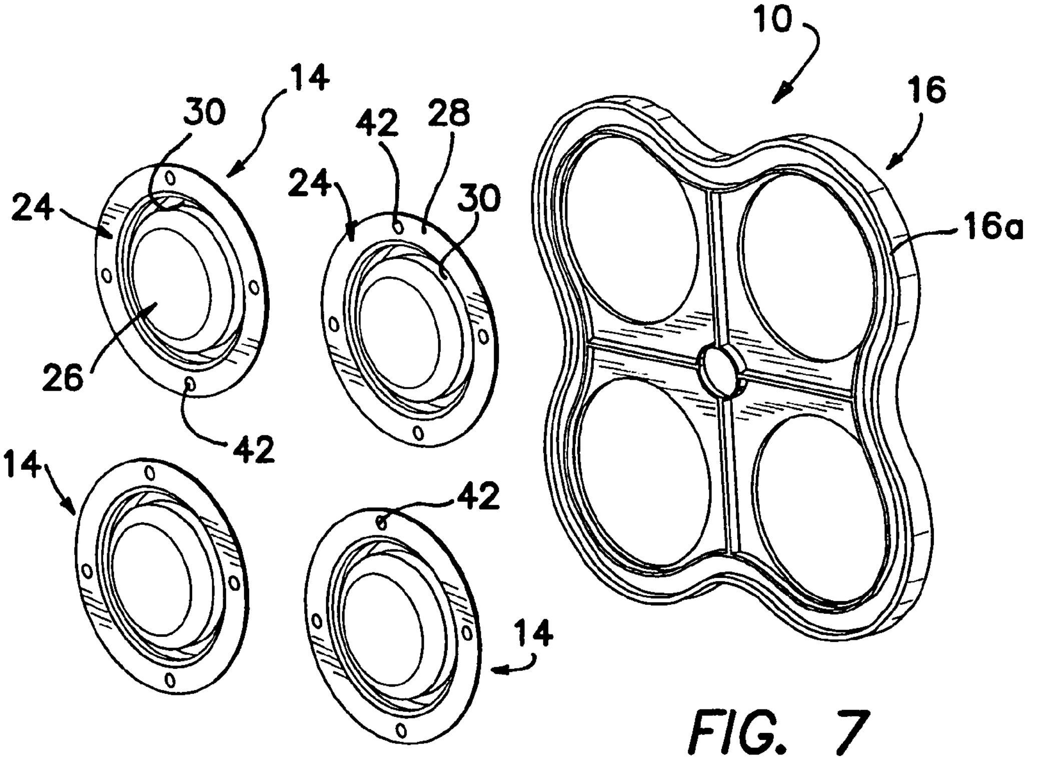
FIG. 7 is an exploded view of the diaphragm assembly shown in FIG. 3.
Figure 6:
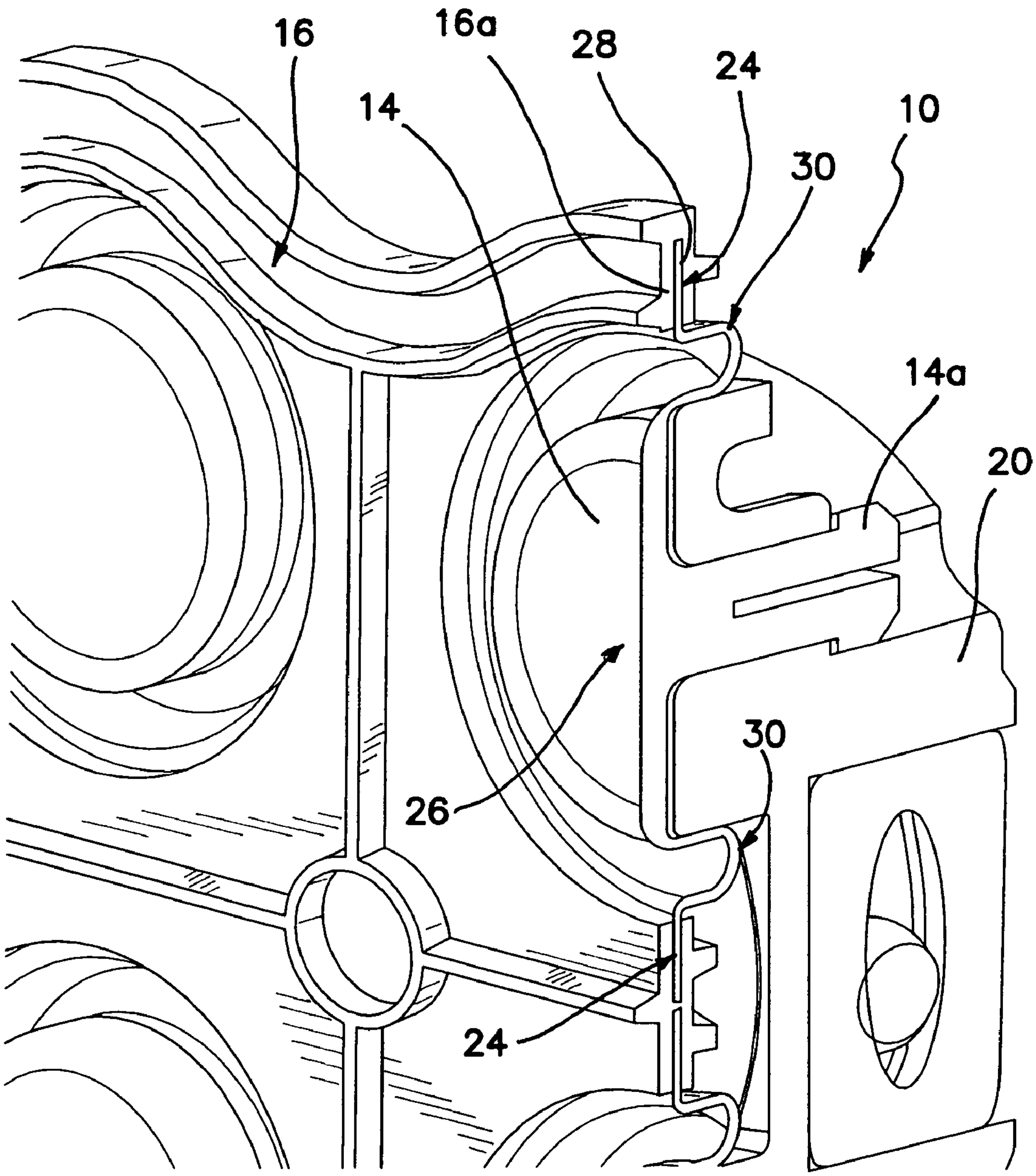
FIG. 6 is a cross-sectional view of the diaphragm assembly shown in FIG. 3 and the connection between the pistons and a wobble plate drive.

Referring now to FIG. 6 and FIG. 7, each of the pistons 14 includes a peripheral region 24, for example, a generally annular peripheral region, preferably substantially circumscribing a pumping region 26. The peripheral region 24 comprises a substantially planar annular region 28 which is generally disposed in a plane occupied by pumping region 26. When the diaphragm assembly 10 is in use, the pumping region 26 moves in a generally axial direction when driven by a drive, for example, a wobble plate drive.

Each piston 14 further comprises a convolute 30 located radially outwardly of the pumping region 26 and radially inwardly of the peripheral region 26. The peripheral region 24 and/or convolute 30 facilitate the movement of the pumping region 26 during the intake and discharge strokes.

Advantageously, each of the pistons 14 includes a structure, for example, a pin or projection **14*a* for enabling connection of the piston 14 to an actuator. The projection 14*a* can be an integrally molded portion of the piston 14**.

Preferably, the first material, of which the pistons 14 are made, has at least one of a higher stiffness, rigidity, tensile strength, or surface hardness than the second material of which the frame element 16 is made.

The piston material, or first material, preferably comprises a polymeric material, for example, a polyolefin material, for example a polypropylene material, for example, a thermoplastic polypropylene material. In some embodiments, the piston material comprises a material that is somewhat more flexible than a homopolymer polypropylene material. In a preferred embodiment, the piston material is a D Shore polymeric material. Suitable materials are commercially available. A preferred material of the piston 14 is a thermoplastic material available from Solvay Engineered Polymers for example, Nexprene® 1030D, 1040D, 1050D, 1330D, 1340D, and 1350D, or other D Shore material, or Santoprene® equivalent available from Advanced Elastomer Systems.

The material of which the frame element 16 is made is preferably formed of an elastomeric material having elasticity greater than that of the pistons 14. The second material may be relatively more compressible and/or more elastic and/or softer than the first material. The second material may be a polymeric material, for example, a thermoplastic elastomeric material, for example, a thermoplastic rubber material, for example, a thermoplastic crosslinked polymeric material. In a preferred embodiment, the frame material is an A Shore polymeric material. Suitable materials for the frame element 16 are commercially available. A preferred material is a crosslinked thermoplastic, or a thermoplastic vulcanizate (TPV). Suitable TPVs include Nexprene® 1075A, Nexprene® 1375A, other A Shore materials, or Santoprene® equivalent.

In a specific embodiment, the first material comprises a D Shore polymeric material and the second material comprises an A Shore elastomeric polymeric material.

In one advantageous aspect of the invention, the pistons 14 of the diaphragm assembly 10 are structured to resist ballooning during use of the assembly in a pump system. Such ballooning is common in conventional diaphragms, particularly at convolute 3 shown in FIG. 2 (PRIOR ART) and typically results in degradation of pump performance. Because the pistons 14 in the assembly 10 of the present invention are designed and structured to not become substantially stretched or ballooned when the piston material becomes fatigued, the diaphragm assembly 10 provides a more consistent flow and more consistent pumping pressure than a conventional diaphragm 1 used under identical conditions and/or circumstances.

Figure 7A:
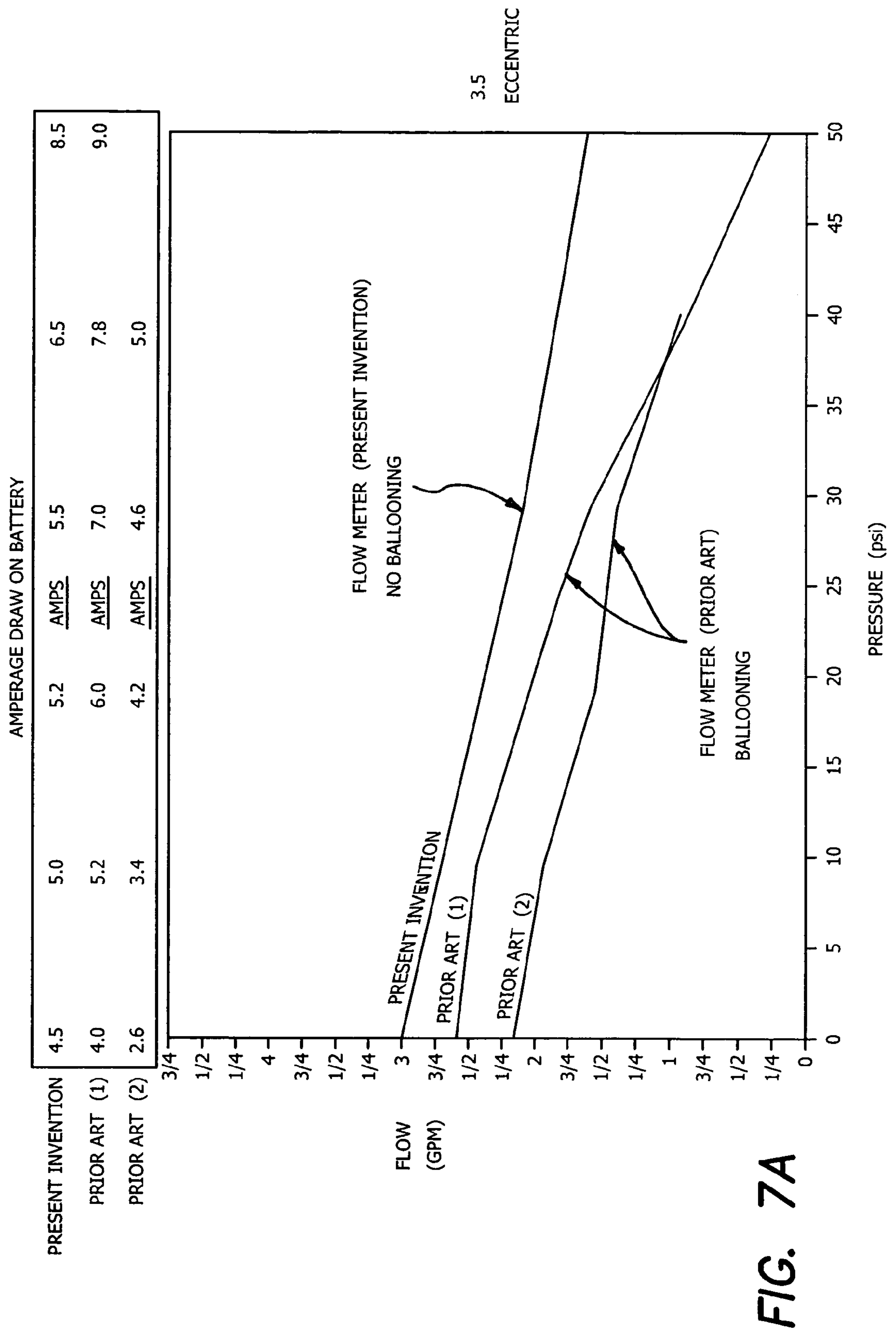
FIG. 7A is a flow chart comparing flow curves of two different prior art diaphragms and a flow curve of a diaphragm assembly of the present invention.

For example, FIG. 7A shows a flow chart comparing pump performance using the present diaphragm assembly and pump performance using prior art diaphragm assemblies. As shown, the top curve represents a flow meter reading of a pump equipped with a diaphragm assembly of the present invention. No ballooning of the diaphragm has occurred, and the curve is consistent even at relatively high flow rates and relatively high amperage draw on the pump battery. The bottom two curves represent flow meter readings of the same pump equipped with conventional one piece molded diaphragms. Ballooning of the diaphragms results in an inconsistent flow even at relatively low flow rates and relatively low amperage draw on the pump battery. Ballooning of the conventional diaphragms is evident from the relatively sudden drops along the flow curves.

In another aspect of the invention, the diaphragm assembly 10 may be structured so that the convolute 30 will burst or break without initial substantial ballooning thereof, for example, when a predetermined pumping pressure is exceeded and/or when the piston material at the convolute 30 becomes fatigued.

For example, the pistons 14 of the assembly 10 may have a burst pressure of between about 100 psi and about 250 psi, more preferably, between about 120 psi and about 240 psi, more preferably, between about 160 psi and about 200 psi, for example, about 180 psi.

In a particular embodiment of the invention, the piston convolute 30 has a thickness of less than about 0.2 inch, for example, less than about 0.1 inch, for example, less than about 0.08 inch, for example, less than about 0.06 inch, for example, less than about 0.04 inch. In a more specific embodiment of the invention, the convolute 30 has a thickness of about 0.02 inch.

In a particularly useful embodiment of the invention, the thickness of the convolute 30 is substantially less than the thickness of the pumping region 26. This is most clearly shown in FIG. 6. In this exemplary embodiment, the thickness of the convolute is about 0.02 inch, the thickness of the pumping region 26 is about 0.08 inch.

Figure 8A:
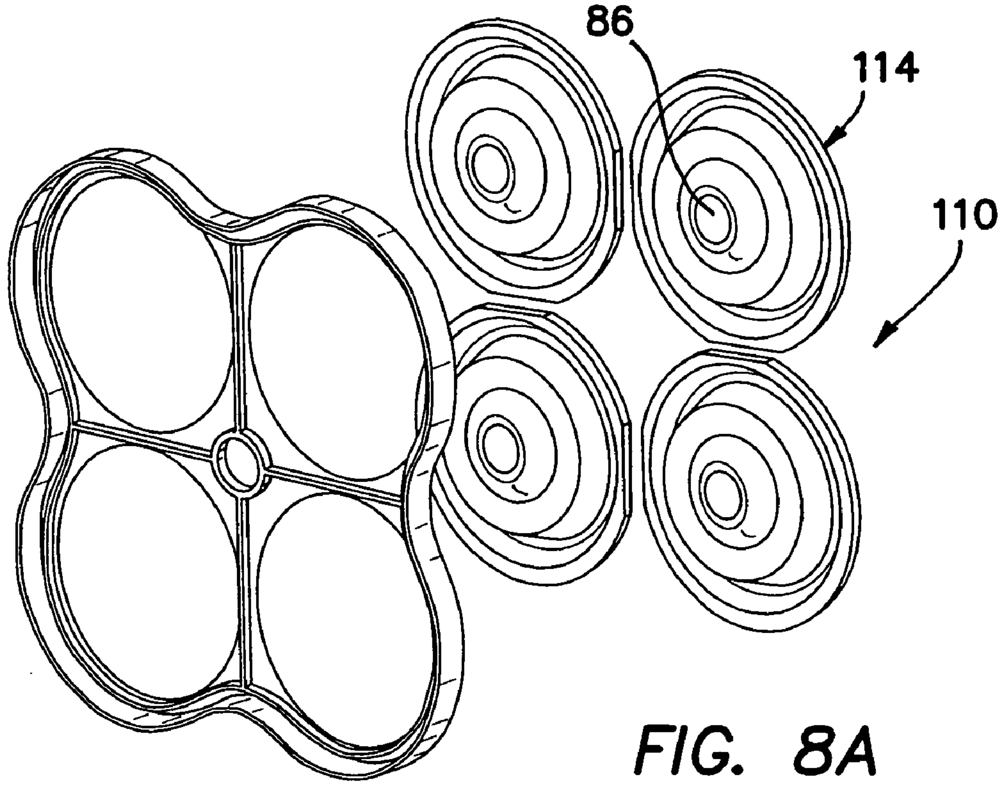
FIG. 8A and FIG. 8B show a top perspective exploded view and a bottom perspective exploded view, respectively, of another diaphragm assembly of the invention.
Figure 8B:
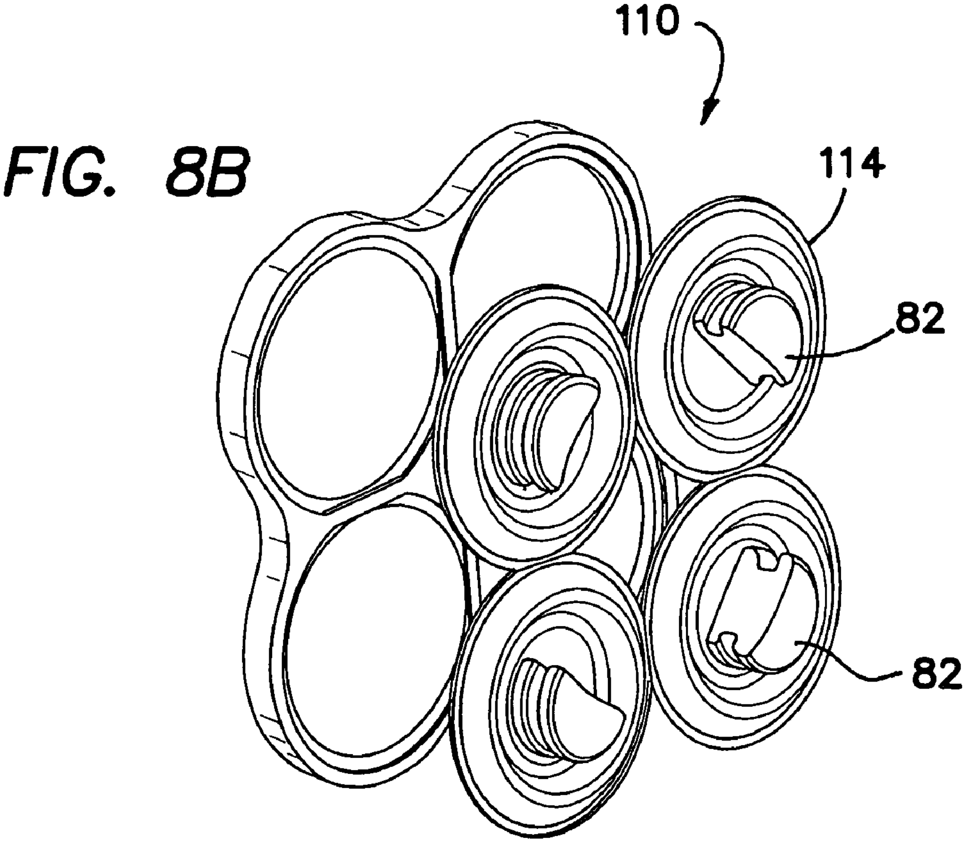

FIGS. 8A and 8B show a top perspective view and a bottom perspective view, respectively of another diaphragm assembly of the invention, generally at 110. Except as expressly described herein, assembly 110 is similar to assembly 10 and features of assembly 110 which correspond to features of assembly 10 are designated by the corresponding reference numerals increased by 100.

Assembly 110 is substantially the same as assembly 10, with the primary difference being the structure of pistons 114. For example, projections 14*a* of assembly 10 have been replaced by substantially crescent shaped projections 82 of each piston 114 which allows the assembly 110 to snap into engagement with a wobbler plate of a pump actuator (not shown). Additionally, pumping region 126 includes optional raised regions 86 as shown in FIG. 8A. Various other piston configurations are contemplated and are considered to be within the scope of the invention.

FIG. 8C shows a cross-sectional view of the diaphragm assembly 110 in order to illustrate an alternative to the overmolding construction of assembly 10.

As shown, each of pistons 114 is bonded or sealed at peripheral region 124 to frame portion 116 by any suitable means, for example, by heat bonding. As shown, each of pistons 114 includes a generally asymmetrical thickness profile as may be desirable for certain pumping applications.

FIG. 9 shows yet another diaphragm assembly of the invention, generally at 210. Except as expressly described herein, assembly 210 is similar to assembly 110 and features of assembly 210 which correspond to features of assembly 110 are designated by the corresponding reference numerals increased by 100.

Assembly 210 is substantially the same as assembly 110 with the primary difference being that the pistons 214 are all coupled together as part of a unitarily molded piston plate 90. Frame portion 216 is bonded or sealed to piston plate 90 as described hereinabove with reference to assembly 210. In the specific embodiment shown, piston plate 90 comprises Nexprene® 1340D and/or Nexprene® 1350D material, or Santoprene® equivalent, and frame portion 216 comprises Nexprene® 1375A material or Santoprene® equivalent.

The present invention further provides methods for making a diaphragm assembly, such as the diaphragm assembly described elsewhere herein. The method generally comprises the steps of providing at least one piston comprising a first material and having a peripheral region; providing a frame element comprising a second material, preferably different from the first material, and securing the piston to the frame element. For example, the step of securing may comprise heat sealing, adhesively securing, and/or other suitable means effective to secure the piston to the frame element.

In a particularly advantageous embodiment of the invention, the methods for making a diaphragm assembly comprises the steps of providing at least one piston, for example, a plurality of pistons, placing the at least one piston in a molding machine; and forming a frame element around the at least one piston by overmolding a second material to the peripheral region of the at least one piston.

As can be most clearly seen in FIG. 6, the frame element 16 includes substantially opposing wall portions 16*a* which are overmolded over the peripheral region 24 of each piston 14. The frame element 16 creates an overmolded, fluid tight seal with the pistons 14. In this specific exemplary embodiment of the invention, the wall portions 16*a* overmolding the pistons 14 each have a thickness of about 0.03 inch one each side of the pistons 14, and the diaphragm assembly 10 has an overall thickness at overmolded portions thereof of about 0.08 inch. Thickness of the pumping region 26 in the shown embodiment is about 0.08 inch.

Overmolding is a well known, two step fabrication process. In the present invention, pistons 14 are first formed, for example, by injection molding the first material, for example, a homopolymer polypropylene. The pistons 14 are then transferred to an injection molding machine having a second mold cavity having the shape of the frame element 16. Referring to FIG. 7, pistons 14 may include structure, for example, apertures 42 in outer peripheral region 24, for facilitating mounting of the pistons 14 in an injection molding machine. The second material, for example, a thermoplastic elastomer, is injected into the frame element shaped cavity and molded onto the peripheral regions 24 of the pistons 14, thereby forming the frame element 16. The pistons 14 comprise materials that can endure high mold temperatures during the second step of this process.

Many other advantages are realized using the present diaphragm assemblies and methods. Because the diaphragm assemblies are created using different materials for the pistons and the frame element, the pistons can be made to have a desired stiffness while the frame element can be made to have a compressibility that creates a tight seal with components of the pump. Because the pistons and frame element are created separately, the material characteristics of one of the piston and frame element, such as tolerances, compressibility, hardness, tensile strength, flexibility, etc. are not substantially affected or limited by materials selected for the other. In addition, because the pistons of the present assemblies can be made to perform very reliably and/or consistently even when made to be very thin, in comparison to conventional diaphragms, the assemblies can be used to achieve high fluid flow even in very small areas. The assemblies readily achieve high performance using lower amperes or power draw relative to conventional diaphragms.

While this invention has been described with respect to various specific examples and embodiments, it is to be understood that the invention is not limited thereto.

What is claimed is:

1. A diaphragm assembly for use in a pump, the assembly comprising:

at least one piston comprising a first material and having a pump region and peripheral region circumscribing the pump region, the at least one piston defining a convolute located radially inwardly of the peripheral region; and a frame element overmolded to the peripheral region of the at least one piston and comprising a second material different from the first material.

2. The assembly of claim 1 wherein the frame element circumscribes the at least one piston.

3. The assembly of claim 1 wherein the first material has at least one of a greater stiffness, a greater rigidity, a greater hardness, and a greater tensile strength than the second material.

4. The assembly of claim 1 wherein the first material comprises a polymeric material.

5. The assembly of claim 1 wherein the first material comprises a polyolefin material.

6. The assembly of claim 1 wherein the first material comprises a material having a D Shore hardness.

7. The assembly of claim 1 wherein the second material is overmolded to substantially only the peripheral region of the at least one piston.

8. The assembly of claim 1 structured to allow the convolute to burst without any initial ballooning thereof during use of the assembly in a pump.

9. The assembly of claim 1 wherein the convolute has a burst pressure of between about 100 psi and about 250 psi.

10. A diaphragm assembly for use in a pump, the assembly comprising:

at least one piston comprising a first material and having a pump region and peripheral region circumscribing the pump region; and a frame element comprising a second material different from the first material overmolded to the peripheral region of the at least one piston;

the first material comprising a polypropylene material.

11. The assembly of claim 10 wherein the at least one piston defines a convolute located radially inwardly of the peripheral region.

12. A diaphragm assembly for use in a pump, the assembly comprising:

at least one piston comprising a first material and having a pump region and peripheral region circumscribing the pump region; and a frame element comprising a second material different from the first material overmolded to the peripheral region of the at least one piston;

the second material comprising a thermoplastic polymeric material.

13. The assembly of claim 12 wherein the second material comprises a crosslinked thermoplastic polymeric material.

14. The assembly of claim 12 wherein the second material comprises a thermoplastic elastomeric polymeric material.

15. A diaphragm assembly for use in a pump, the assembly comprising:

at least one piston comprising a first material and having a pump region and peripheral region circumscribing the pump region; and a frame element comprising a second material different from the first material overmolded to the peripheral region of the at least one piston;

the second material comprising a material having an A Shore hardness.

16. The assembly of claim 15 wherein the first material comprises a material having a D Shore hardness.

17. A diaphragm assembly for use in a pump, the assembly comprising:

at least one piston comprising a first material and having a pump region and peripheral region circumscribing the pump region; and a frame element comprising a second material different from the first material overmolded to the peripheral region of the at least one piston;

the at least one piston comprising four pistons.

18. The assembly of claim 17 wherein the at least one piston defines a convolute located radially inwardly of the peripheral region.

19. A diaphragm assembly for use in a pump, the assembly comprising:

at least one piston comprising a first material and having a pump region and peripheral region circumscribing the pump region; and a frame element comprising a second material different from the first material overmolded to the peripheral region of the at least one piston;

the assembly being structured to be used in a wobble plate pump.

20. The assembly of claim 19 wherein the at least one piston defines a convolute located radially inwardly of the peripheral region.

* * * * *